No. 623,999. Patented May 2, 1899.
J. B. DUNLOP & J. B. DUNLOP, Jr.
ADJUSTABLE BEARING.
(Application filed Dec. 24, 1897.)
(No Model.)
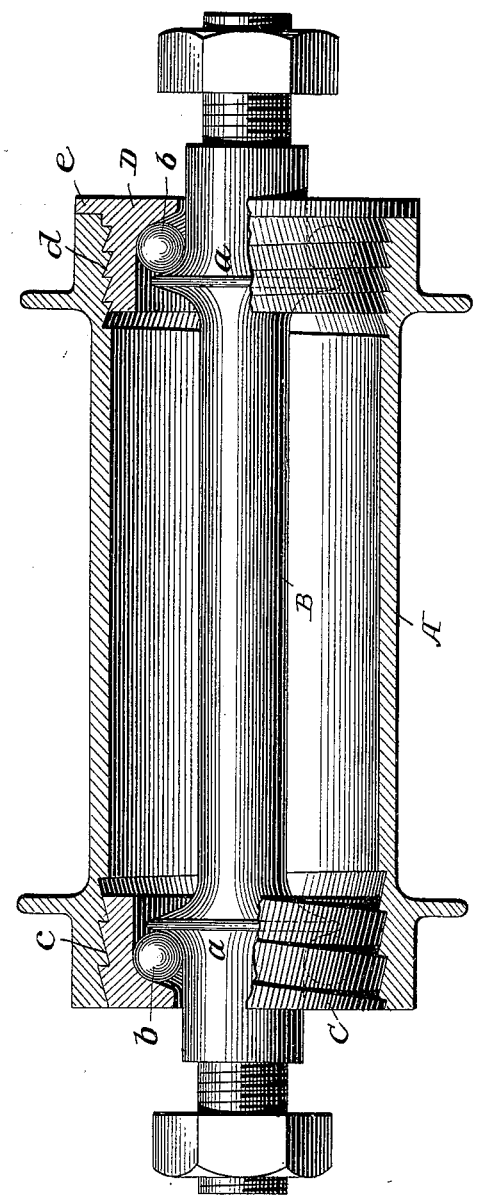

United States Patent Office.

JOHN BOYD DUNLOP AND JOHN BOYD DUNLOP, JR., OF DUBLIN, IRELAND.

ADJUSTABLE BEARING.

SPECIFICATION forming part of Letters Patent No. 623,999, dated May 2, 1899.

Application filed December 24, 1897. Serial No. 663,394. (No model.)

*To all whom it may concern:*

Be it known that we, JOHN BOYD DUNLOP and JOHN BOYD DUNLOP, Jr., subjects of the Queen of England, residing at Dublin, Ireland, have invented certain new and useful Improvements in or Relating to Adjustable Bearings, of which the following is a specification.

It has hitherto been the practice to adjust the bearings of cycles and vehicles by means of a screw-threaded cone or cup and to lock the cone or cup by means of a nut, and as the parts wear they require to be readjusted.

The object of this invention is to produce a self-adjusting bearing which will take up the wear and not require to be locked.

In carrying out our invention for self-adjusting bearings as applied, for instance, to ball-bearings of a cycle-wheel we adjust by means of a cup or cups. The cup on the left side is provided with left-hand screw-threads and the cup on the right side with right-hand threads. The diameter of the cup being less than the inside diameter of the hub, if the bearing be loose the weight of the rider causes the cup to be eccentric to the hub. The rotation of the wheel causes the cup to roll within the hub, and thus rotate in relation to the hub in a direction tending to screw the cup home against the balls. In order to prevent the cup being screwed too firmly against or cramping the balls or opposite bearing element, we provide the cup with screw-threads of unusually coarse pitch, about six threads to the inch on a cup of the usual size, and in order to obtain a steady screw-bearing surface the said threads are in the form of reversed buttress-threads or wide threads having their bearing side slightly inclined. We prefer to have the bearing-surface of the screw-threads inclined about twelve degrees from the axis. When we desire to have one cup only self-adjusting, we provide the fixed or self-locking cup with a flange to engage with the edge of the hub and also with screw-threads similar to those already described, but preferably of finer pitch.

In order to make our invention clearly understood, we illustrate it as applied to cycle-wheels, the accompanying drawings showing, on an enlarged scale and in longitudinal section, a hub provided with our improved self-adjusting bearings.

A designates the hub, and B the axle, having the usual bearing-cones $a\ a$ thereon.

C and D are the self-adjusting bearing-cups, which fit somewhat loosely into the hub and are provided with reversed buttress screw-threads adapted to engage corresponding screw-threads in the hub, and between the cups and cones are preferably arranged anti-friction-balls $b$. The cup C has left-hand screw-threads $c$ and is located at the left side of the hub, while the cup D at the opposite side of the latter is provided with right-hand screw-threads $d$, as clearly shown. A flange $e$ on the cup D abuts against the end of the hub and serves as a stop to limit the inward movement of the cup.

The operation of the invention will be readily understood from the foregoing description.

Without limiting ourselves to the precise construction and arrangement of parts shown, we claim—

1. In a bearing, the combination of a hub having screw-threads, a bearing-cup having corresponding screw-threads and fitting loosely within the hub, and an axle having a bearing-cone, the threads being of such character and pitch that the cup will tend to screw into the hub and automatically adjust itself therein without cramping the opposite bearing element, substantially as described.

2. In a bearing, the combination of a hub having buttress screw-threads at one end, a bearing-cup having corresponding screw-threads and fitting loosely in the hub, an axle, a bearing-cone thereon, and balls interposed between said cup and cone, the construction being such that the cup will automatically adjust itself within the hub, substantially as described.

In witness whereof we have hereto set our hands in the presence of the two subscribing witnesses.

JOHN BOYD DUNLOP.
JOHN BOYD DUNLOP, JUNIOR.

Witnesses:
CECIL PIATT,
URIAH B. ANBLY.